Jan. 30, 1945.  P. J. HOGAN  2,368,544
RETAINING DEVICE
Filed May 7, 1941  3 Sheets-Sheet 1
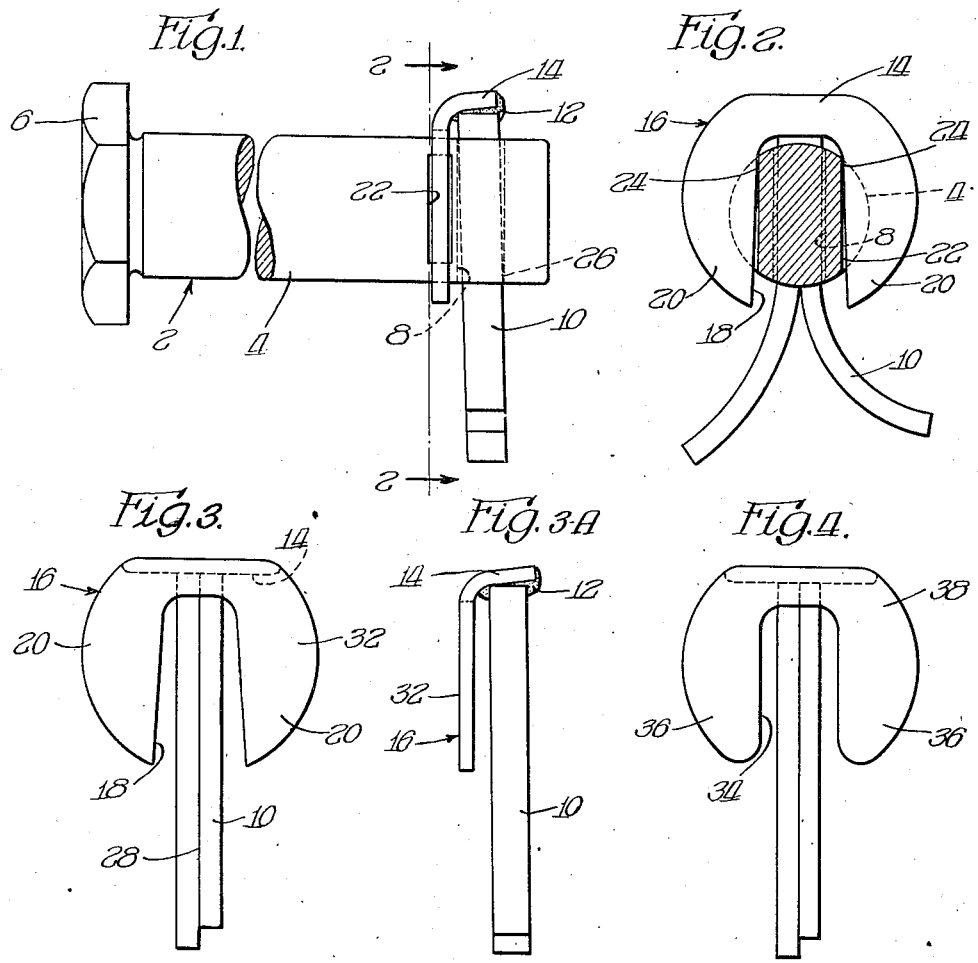
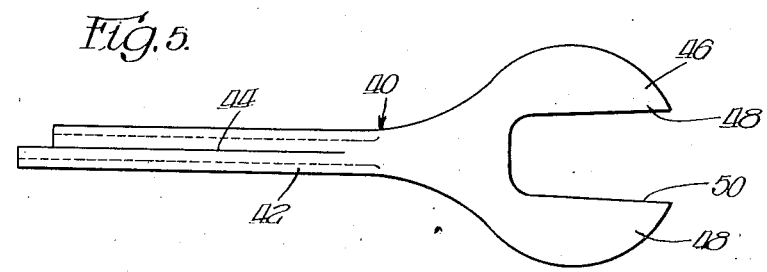
INVENTOR.
Patrick J. Hogan
BY
Atty.

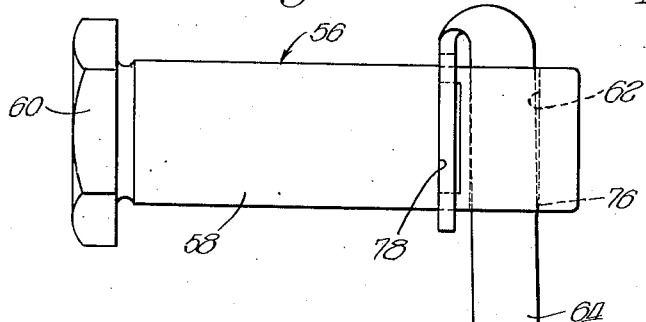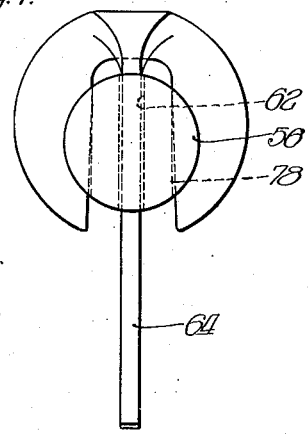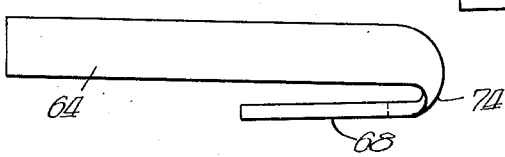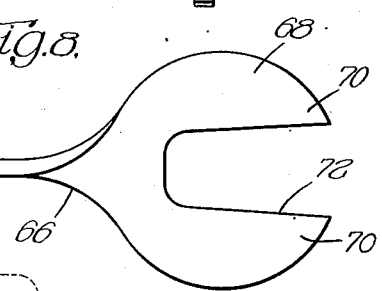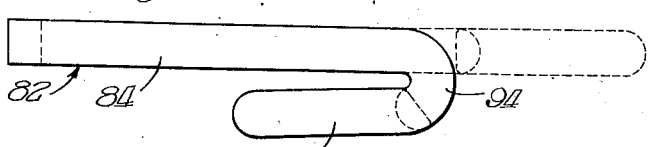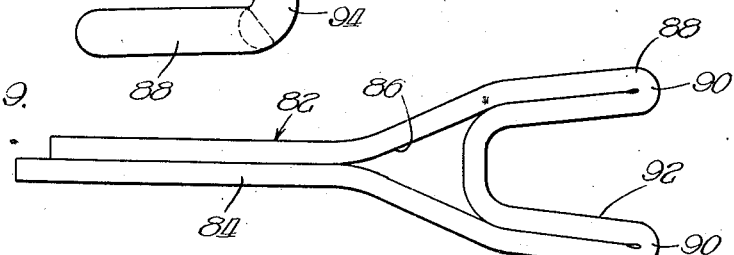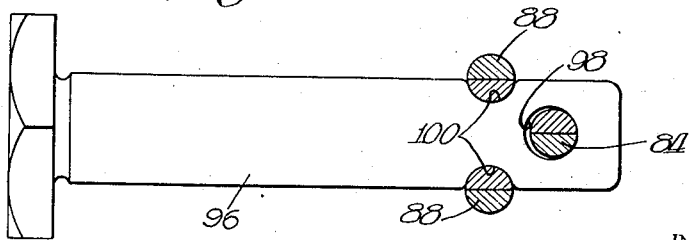

Jan. 30, 1945.　　　　　P. J. HOGAN　　　　　2,368,544
RETAINING DEVICE
Filed May 7, 1941　　　　　3 Sheets-Sheet 3

INVENTOR.
Patrick J. Hogan
BY
Atty.

Patented Jan. 30, 1945

2,368,544

UNITED STATES PATENT OFFICE 2,368,544

RETAINING DEVICE

Patrick J. Hogan, New Haven, Conn.

Application May 7, 1941, Serial No. 392,225

5 Claims. (Cl. 85—8.5)

My invention relates to retaining means for pins, bolts, and other similar securing members.

The main object of my invention is to design a retainer for brake pins commonly used in railway brake arrangements wherein wear between the retainer and the pin because of vibrations of the parts is reduced to a minimum and wherein long life under service conditions is obtained.

In my invention a brake pin may be formed with a transverse passage at one end thereof for reception of the shank portion of my novel retainer device and with slots spaced inwardly from said passage on opposite sides of said pin for receiving jaw portions on the head of said device, said head being of generally washer-like form with the jaws tightly clasping the brake pin.

An object of my invention is to design a novel key retainer wherein the head at one end of the key is positioned between its shank portion and the associated secured member and serves as a washer.

Another object of my invention includes a key device wherein the possibility of shearing off the key is reduced to a minimum, the shearing stresses being transmitted through the head to the brake pin with the shank portion of said key being substantially free from said shearing stresses.

In the drawings,

Figure 1 is a side elevation of a brake pin with one modification of my novel retainer device applied thereto.

Figure 2 is a sectional view through the brake pin shown in Figure 1, the section being taken substantially in the transverse plane indicated by the line 2—2 of Figure 1.

Figures 3 and 3A show in detail the retainer device used in the structure shown in Figure 1, Figure 3 being a front plan view, and Figure 3A being a side view.

Figure 4 is a front plan view of a modification of the retainer device shown in Figures 3 and 3A.

Figures 5 and 5A show a further modification of the retainer device shown in Figures 3 and 3A, Figure 5 being a top plan view of the retainer before the head is bent into final position, and Figure 5A being a side elevation showing the key in its final form.

Figures 6 and 7 show still another modification of my novel key device applied to a brake pin, Figure 6 being a side elevation, and Figure 7 being an end view taken from the right of Figure 6.

Figures 8 and 8A show in detail the key device used in Figures 6 and 7, Figure 8 being a top view of the key with the head twisted approximately 90° to the shank, and Figure 8A being a side elevation of the key shown in Figure 8 in its final form.

Figures 9 and 9A show a different modification of my novel key device, Figure 9 being a top plan view before the head is bent to its final position, and Figure 9A being a side elevation showing the key device in its final form.

Figure 10 is a top view of a brake pin showing the application of a key in Figures 9 and 9A, said key being shown in section, the section being taken in the transverse plane through the key device just above the surface of the brake pin.

Figure 11:
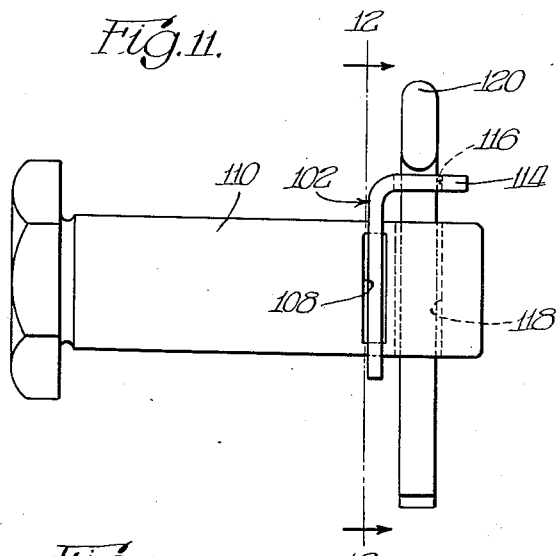
Figure 11 is a side elevation of another modification of my novel invention.

In the embodiment shown in Figures 1 to 3, the brake pin 2 comprises a shank 4 having at one end a head 6 and adjacent to its opposite end a transverse passage or hole 8 extending therethrough. The shank or body portion 10 of my novel key retainer projects through the passage 8 and a flange 14 on the head 16 of the key is secured to one end of said shank in any convenient manner as by welding at 12. The head 16 is of washer-like form presenting a generally circular outline and extends along a portion of the shank 10 in lateral spaced relationship therewith and diverging slightly therefrom. The head 16 is slotted as at 18 to form spaced jaws 20, 20, the inner edges of said slot 18 being flared slightly outwardly and accommodated within the grooves 22, 22 formed on opposite sides of the pin 4 and spaced axially inward from the passage 8. In application, the shank and head are inserted into the passage 8 and grooves 22, 22 respectively and are driven into position so that the inmost edges of the slot 18 are tightly wedged against the brake pin 4 as at 24, 24 and the shank 10 tightly engages at 26 a lower portion of the inner surfaces of the passage 8. The shank 10 is longitudinally split as at 28, one of said split portions being slightly longer than the other to facilitate spreading the split portions to further secure the key on the brake pin. It will be apparent that the head 16 serves as a washer and presents a flat face 32 against which the associated secured member may have bearing. Shear stresses are transmitted through the head 16 to the brake pin by its engagement with the grooves 22, 22, and it will thus be apparent that the shank 10 is substantially free of shearing stresses.

The modification of the cotter key device shown in Figure 4 differs from that shown in Figures 3 and 3A only in that the slot 34, which is defined by the jaws 36, 36 formed on the head 38, is afforded edges which are substantially parallel instead of being flared outward as in the previous modification. The application of the cotter key device is substantially identical with that described in Figures 1 and 2.

In the modification shown in Figures 5 and 5A the head and shank of the key 40 are formed integrally instead of being welded as in the device shown in Figures 3 and 3A. The shank 42 may be split into two members as at 44 with one member slightly longer than the other to facilitate spreading thereof in assembly. The generally circular head 46 is integrally formed with the shank 42 and presents the jaws 48, 48 which define the slot 50. The configuration of said head 46 is substantially similar to that in the modification shown in Figures 3 and 3A with the inner edges of slot 50 flared slightly outward. After the head and shank have been formed as shown in Figure 5, the head may be bent or folded over at 52 so that it lies along an adjacent portion of the shank 42 in spaced and slightly diverging relationship. The key 40 is applied to a brake pin in similar manner to that described in the first modification with inmost edges of slot 50 in wedge engagement with the associated pin within accommodating grooves and the shank 42 extending through the hole in the pin spaced axially from the grooves.

In the modification shown in Figures 6 and 7 the brake pin 56 is formed with a shank 58 having at one end a head 60 and having at its opposite end a rectangular transverse passage 62 extending therethrough, the long diameter of said passage being aligned with the longitudinal axis of said pin. Extending through the passage 62 is the shank 64 of the key retainer 66, said shank 64 being formed of rectangular cross-section. The key 66 has a head 68 of generally washer-like form with the jaws 70, 70 defining therebetween the slot 72 which is afforded slightly outward flaring inner edges. The head 68 may be twisted approximately 90° with respect to the shank 64 as shown in Figure 8 and may then be bent back as at 74 to almost parallel spaced relationship with the shank 64, slight divergence being allowed so that said shank may be sprung against the inner surfaces of the passage 62 at 76. The jaws 70, 70 embrace or clasp the brake pin within accommodating slots 78, 78 formed in opposite sides of the brake pin and spaced axially inward from the passage 62. The lower end of the shank 64 may be bent upward to either the right or left of the brake pin to firmly secure said key on the brake pin. Application of key 66 is similar to that previously described.

In the modification of my novel key retainer shown in Figures 9 and 10 the cotter key 82 may be formed of half round cotter stock bent into a generally Y configuration. The shank 84 is formed of portions of the cotter stock placed alongside each other to form a substantially circular cross-section, one portion being slightly longer than the other to facilitate assembly. The shank portions of the stock diverge as at 86 to form the forks 88, 88 of the Y, said stock being folded back along the forks 88, 88 as at 90, 90 to afford a slot 92 with slightly outward flared edges. The head is then bent at 94 into lateral spaced relationship with the shank 84 and slightly diverges therefrom. The application of the device 82 to a brake pin is shown in Figure 10 wherein it may be noted that the brake pin 96 is formed at one end with a passage or opening 98 accommodating the shank 84 and grooves 100, 100 formed on opposite sides of the pin for engagement with the forks 88, 88. As in the previous modifications, the head tightly clasps the brake pin within the grooves 100, 100 and the shank tightly engages a portion of the inner surfaces of the passage 98. The portions of the shank 84 may be spread to further prevent disassembly of the key from the shank.

Figure 12:
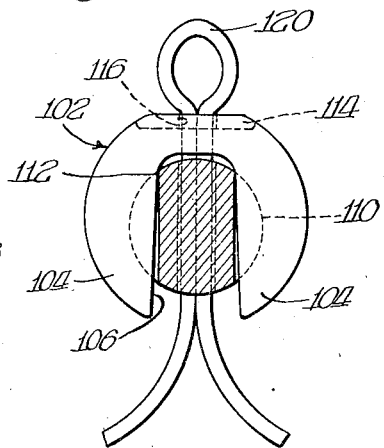
Figure 12 is a sectional view through the structure shown in Figure 11 and taken substantially in the transverse plane indicated by the line 12—12 of Figure 11.

In the modification shown in Figures 11 and 12 it may be noted that my novel invention includes a standard cotter key and a washer-like head of generally similar configuration to that shown in the modification in Figures 1 to 3. The washer-like head 102 is formed with jaw-portions 104, 104 defining a slot 106, the inner edges of which are diverged slightly outwardly. The jaw portions 104, 104 are accommodated within transverse slots 108, 108 formed on opposite sides of the shank of the brake pin 110 and tightly engage said shank at 112. The head 102 is formed with a flanged portion 114 having an opening 116 aligned with the transverse hole or passage 118 in the pin 110, said passage 118 being spaced axially outward from the slots 108, 108. The shank of a standard cotter key 120 extends through the opening 116 and through the hole 118, and the lower end of said shank may be spread in usual manner to securely retain the device on the end of the brake pin.

Figure 13:
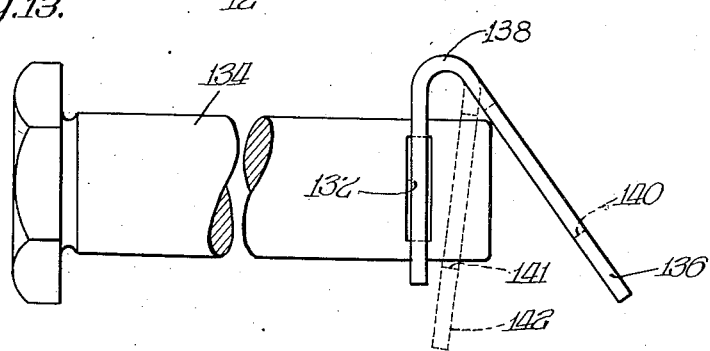
Figure 13 is a side elevation of still another modification of my novel invention.
Figure 14:
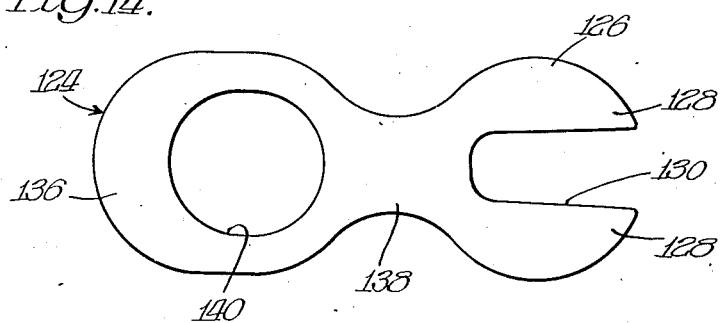
Figure 14 is a top plan view of the key retainer used in the embodiment shown in Figure 13.

In the modification shown in Figures 13 and 14 the key retainer 124 comprises a head 126 of generally similar configuration as the heads in the previous modifications. The spaced jaw portions 128, 128 define therebetween the slot 130 and said jaw portions may be accommodated within the transverse slots 132, 132 formed on opposite sides of the shank of the brake pin 134. The body portion 136 of the key retainer 124 is of generally oval shape and is integrally formed with the head 126 through a neck portion 138. In the body portion 136 is an opening 140 which is adapted to accommodate as at 141 the associated end of the brake pin 134 as said key retainer is bent at its neck portion 138 into assembled position as shown by the dotted lines at 142 in Figure 13. It is thus apparent that the key retainer is secured on the end of the brake pin 134 by the tight engagement of the jaw portions with the shank of the brake pin and by the reception of the end of the brake pin within the opening 140.

It will thus be apparent to those skilled in the art that I have designed a novel key retainer device having a head which not only acts as a washer but also functions to retain said key on said pin and to transmit shearing stresses directly to the pin with the result that shearing off of the retaining key during operation is reduced to a minimum.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A retainer of the class described consisting of a flat rigid head comprising spaced substantially coplanar rigid jaws having their adjacent edges diverging outwardly and defining a slot therebetween, and a straight body member resiliently connected to the spacing portion of said head and diverging outwardly from the plane of said jaws.

2. A retainer of the class described consisting of a flat head with spaced jaws lying in a common plane, and a flat body member lying in a plane approximately perpendicular to said first-mentioned plane, said body member being resiliently connected to the spacing portion of said head and diverging outwardly from said first-mentioned plane.

3. A retainer of the class described formed of a segment of flexible semi-round section stock, so bent that its flat faces are in abutment to form a substantially round section, said retainer including a head with spaced jaws lying in a common plane, and a body member connected to said head and diverging from said plane.

4. A retainer of the class described comprising a flat head with spaced jaws lying in a common plane and a flat body member lying in a plane approximately perpendicular to said first-mentioned plane, said body member being split longitudinally thereof and being resiliently connected to the spacing portion of said head, and said body member diverging outwardly from said first-mentioned plane.

5. A retainer of the class described comprising a flat head with spaced jaws lying in a common plane, the upper edge of said head being flanged, and a flat body member lying in a plane perpendicular to said first-mentioned plane, said body member being welded at its upper end to said flanged portion and diverging outwardly from said first-mentioned plane.

PATRICK J. HOGAN.